United States Patent [19]

Veix

[11] Patent Number: 5,080,747
[45] Date of Patent: Jan. 14, 1992

[54] HEAT SEALING MECHANISM WITH LINEARLY MOVABLE SEAL BARS

[75] Inventor: Scott J. Veix, Bradenton, Fla.
[73] Assignee: Klockner Bartelt, Inc., Sarasota, Fla.
[21] Appl. No.: 519,803
[22] Filed: May 7, 1990
[51] Int. Cl.$^5$ .............................................. B32B 31/20
[52] U.S. Cl. ................................... 156/352; 156/363; 156/364; 156/518; 156/530; 156/583.1; 53/477; 53/455; 53/562; 53/370.7; 53/373.7; 53/373.9; 53/375.9; 493/189; 493/193; 493/200; 493/201; 493/209
[58] Field of Search .............. 156/352, 363, 364, 518, 156/530, 583.1; 53/373.7, 373.9, 370.7, 375.9, 455, 477, 562, 373; 493/189, 193, 200, 201, 209

[56] References Cited

U.S. PATENT DOCUMENTS

| | | | |
|---|---|---|---|
| 3,553,934 | 1/1971 | Johnson et al. | 53/562 |
| 3,986,921 | 10/1976 | Putnam et al. | 156/583.1 |
| 4,585,508 | 4/1986 | Ehlers | 493/193 |
| 4,622,798 | 11/1986 | Oki | 156/583.1 |
| 4,662,978 | 5/1987 | Oki | 156/530 |

Primary Examiner—Caleb Weston
Attorney, Agent, or Firm—Leydig, Voit & Mayer

[57] ABSTRACT

Heated seal bars are located on opposite sides of an elongated strip of heat sealable material adapted to be advanced with a step-by-step motion. When the strip dwells, the bars are shifted linearly inwardly into engagement with the strip to form a heat seal and then are retracted linearly a short distance away from the strip to permit the strip to advance through its next step. If an abnormal condition prevents the strip from advancing, the bars are retracted linearly to a parked position in which the bars are spaced a substantial distance away from the strip in order to prevent the heat radiating from the bars from damaging the stopped strip.

4 Claims, 4 Drawing Sheets

HEAT SEALING MECHANISM WITH LINEARLY MOVABLE SEAL BARS

BACKGROUND OF THE INVENTION

This invention relates generally to a sealing mechanism and, more particularly to a heat sealing mechanism for use in a packaging machine for forming longitudinally spaced side seals in an elongated strip defined by two face-to-face panels of heat sealable film or web.

The strip usually is located in an upright plane and is intermittently advanced along a predetermined path. When the strip dwells between successive steps, heated sealing bars located on opposite sides of the strip are moved inwardly into engagement with the strip in order to seal the two panels of the strip to one another. The sealing bars then are retracted a short distance away from the strip before the next advance of the strip. Operation of the sealing bars is effected automatically at high speeds and in timed relation with the advance of the strip.

One type of well known side sealing mechanism includes pivotally mounted sealing bars which swing into and out of engagement with the strip. With a sealing mechanism of this type, provision is sometimes made for retracting the sealing bars to and holding the bars in a so-called "parked position" in which the bars are swung away from the strip by a significantly greater distance than is the case when the bars retract during normal operation of the machine. The bars are swung to the parked position automatically if an abnormal condition causes the machine to shut down. By parking the bars a significant distance from the stopped strip, the heat radiating from the bars will not soften or melt the strip.

In more advanced sealing mechanisms, the sealing bars are moved linearly into engagement with the strip. With linearly movable seal bars, the sealing pressure may be distributed more uniformly along the height of the strip and, in addition, the pressure may be more precisely controlled.

SUMMARY OF THE INVENTION

The general aim of the present invention is to provide a new and improved sealing mechanism having seal bars which not only move linearly into and out of engagement with the strip during normal operation of the machine but which also retract linearly to a parked position upon shut down.

A more detailed object of the invention is to provide novel mechanism for moving the seal bars linearly through a short stroke and in timed relation with the advance of the strip during normal operation and for retracting the seal bars linearly a substantial distance from the strip and to a parked position if the strip fails to advance in a normal manner.

These and other objects and advantages of the invention will become more apparent from the following detailed description when taken in conjunction with the accompanying drawings.

DETAILED DESCRIPTION OF THE PREFERRED EMBODIMENT

Figure 1:
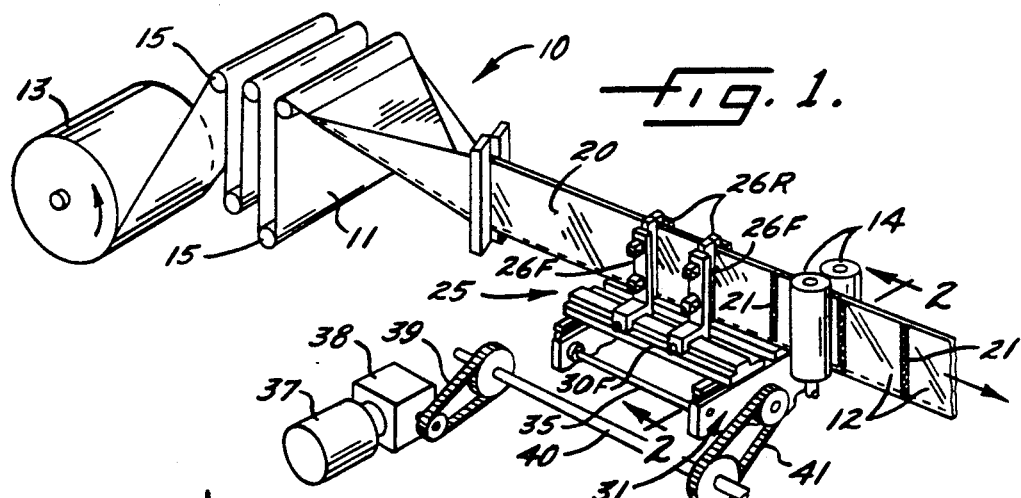
FIG. 1 is a perspective view schematically showing a portion of a typical packaging machine equipped with a new and improved sealing mechanism incorporating the unique features of the present invention.

For purposes of illustration, the present invention has been shown in the drawings in connection with a packaging machine 10 for converting a web 11 of heat-sealable film into pouches 12 which are subsequently filled with product. The web is initially stored on a rotatable supply roll 13 and is pulled off of the supply roll by a pair of downstream feed rolls 14. After leaving the supply roll, the web passes around a series of dancer rolls 15 and then passes beneath a generally V-shaped plow 16. The latter folds the web upwardly and forms the web into an elongated strip 20 disposed in an upright plane and defined by two face-to-face panels whose lower margins are joined by a fold.

The strip 20 threads between the feed rolls 14 and is advanced with a step-by-step motion when the rolls are intermittently rotated. Each time the strip dwells, a side seal 21 is formed vertically along the strip so as to seal the two side panels of the strip to one another at longitudinally spaced intervals. Subsequently, a swingable knife (not shown) cuts through each side seal 21 between the upright edges thereof in order to separate individual pouches 12 from the strip 20. A packaging machine of this type is quite conventional and is disclosed, for example, in Johnson et al U.S. Pat. No. 3,553,934.

Figure 2:
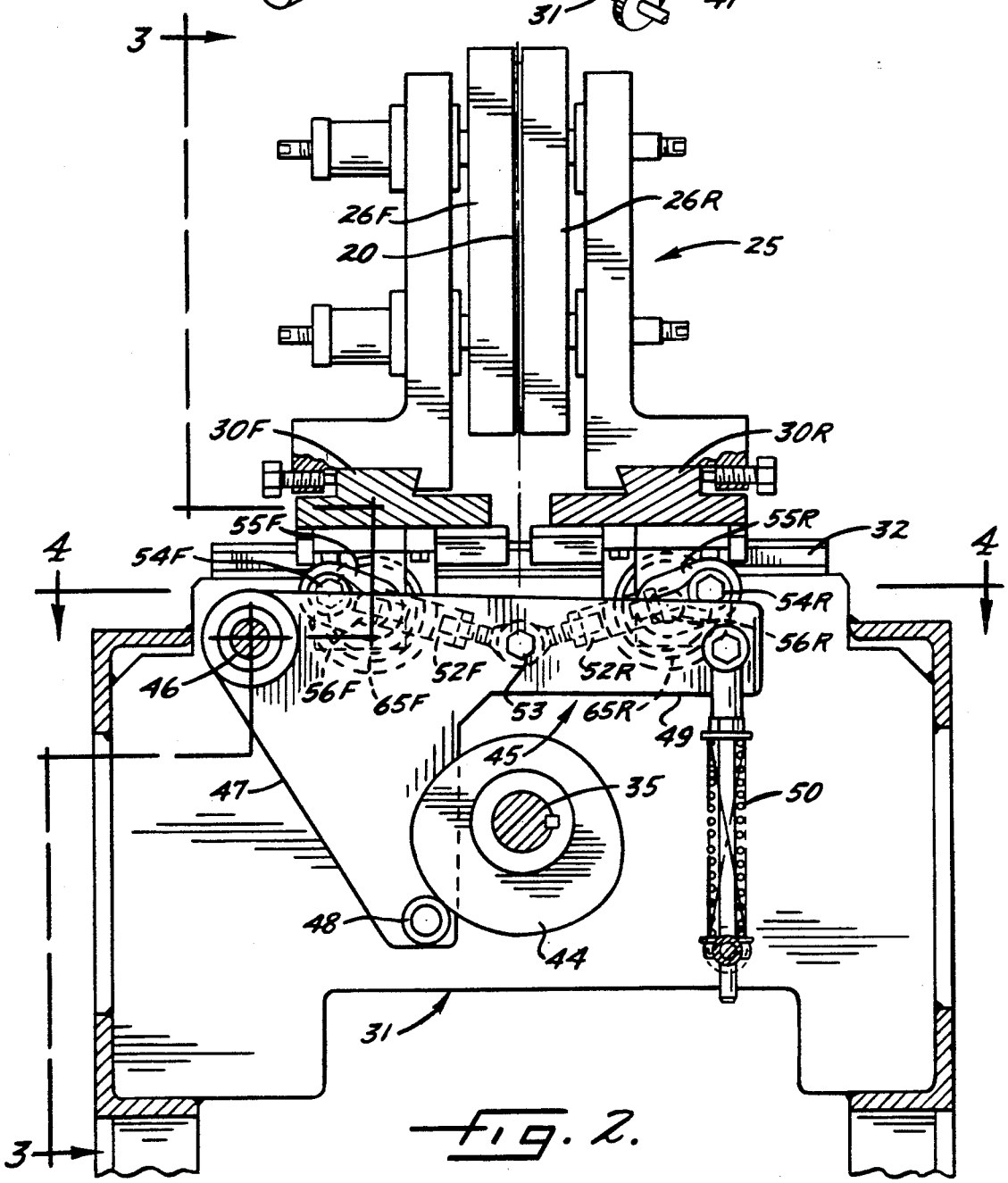
FIG. 2 is an enlarged fragmentary cross-section taken substantially along the line 2—2 of FIG. 1 and shows the sealing bars in sealing engagement with the strip.
Figure 5:
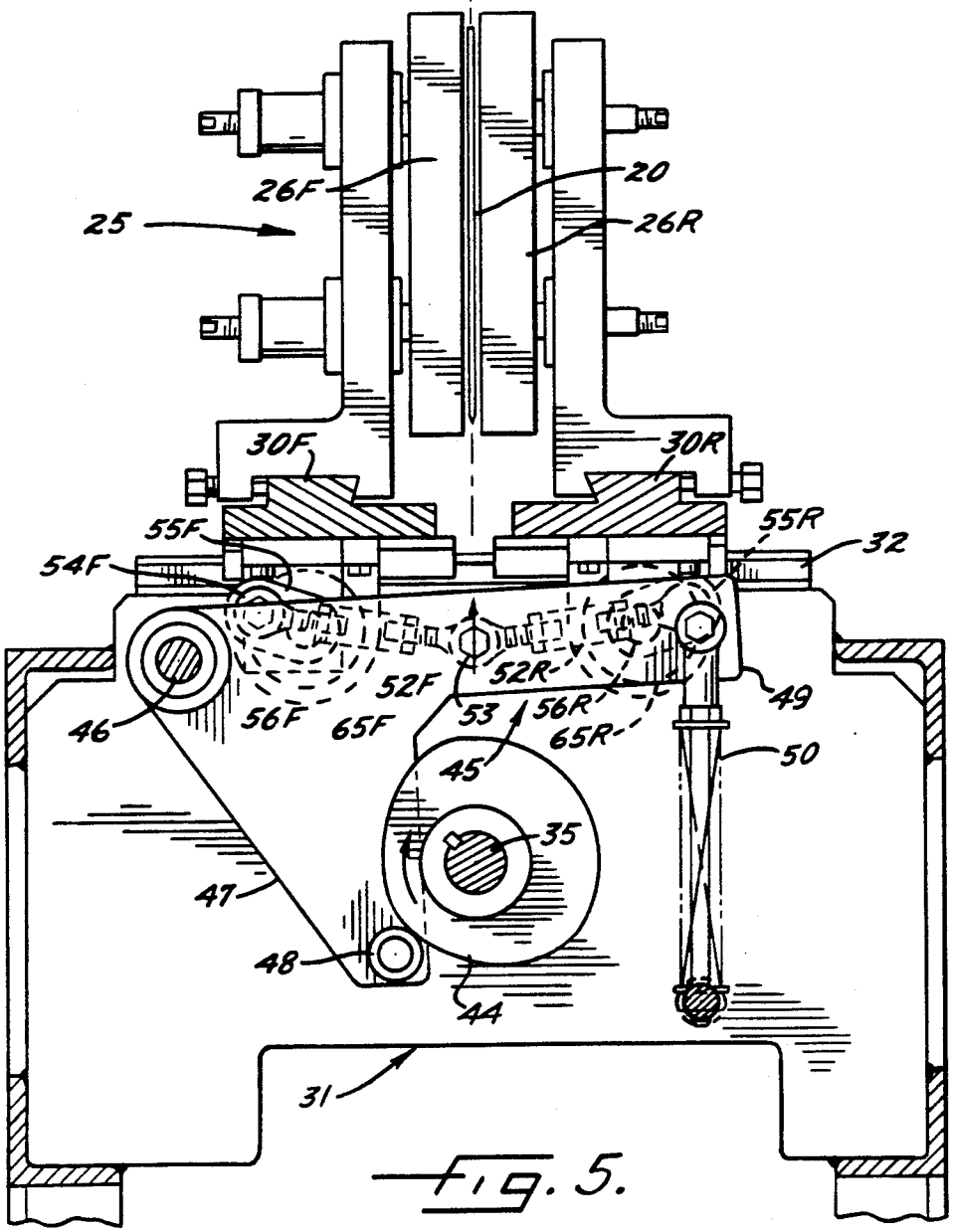
FIG. 5 is a view similar to FIG. 2 but shows the seal bars retracted a short distance away from the strip during normal operation of the machine.

A side sealing mechanism 25 forms a side seal 21 in the strip 20 each time the strip dwells The present sealing mechanism includes upstream and downstream sealers each having front and rear upright sealing bars 26F and 26R located on the front and rear sides of the strip, the bars being adapted to be electrically heated in a well known manner. When the strip dwells, the opposing bars 26F and 26R of each sealer move toward one another and into engagement with the strip as shown in FIG. 2 to heat the panels of the strip and seal the panels together. Before the strip next advances, the seal bars of each sealer are retracted a short distance away from the strip as shown in FIG. 5 so as to release the strip and enable the strip to move downstream. The upstream pair of seal bars forms a preliminary seal 21 while the downstream pair of seal bars subsequently engages the same seal 21 to form the final bond. In many cases, cooling bars (not shown) are located downstream of the downstream sealing bars and engage the seal in order to effect quick setting of the seal.

Figure 3:
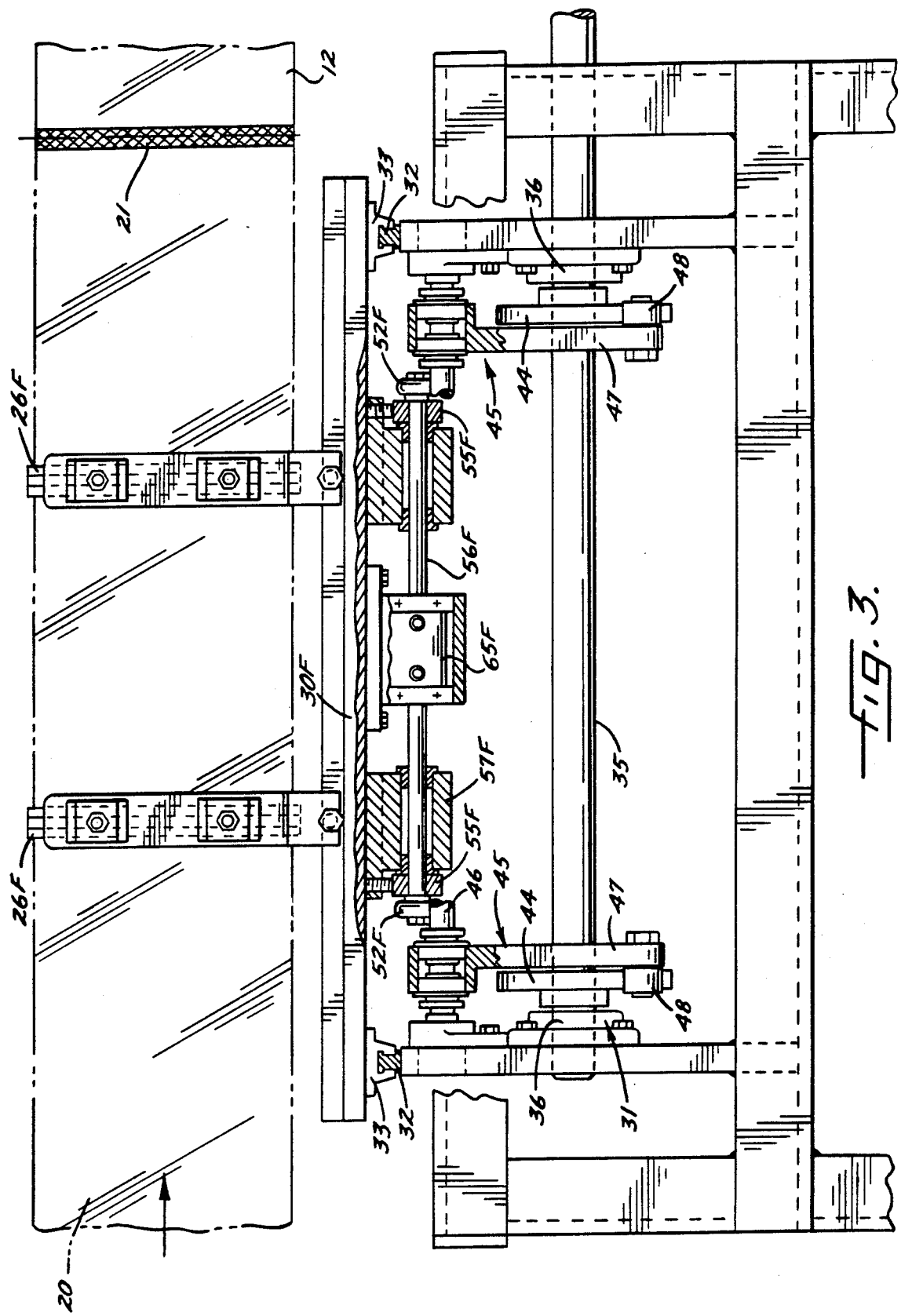
FIGS. 3 and 4 are fragmentary cross-sections taken substantially along the lines 3—3 and 4—4, respectively, of FIG. 2.

The front and rear seal bars 26F and 26R are mounted on front and rear dovetailed carriages 30F and 30R, respectively, and are adapted to be adjusted on the carriages and longitudinally of the strip 20 so as to enable the spacing between the upstream and downstream sealers to be changed in accordance with the particular spacing desired between the seals 21. Each carriage, in turn, is adapted to move linearly toward and away from the strip 20 on a main support or base 31 having ways 32 (FIG. 3) which slidably mate with a precision fit with guides 33 on the undersides of the carriages.

Figure 6:
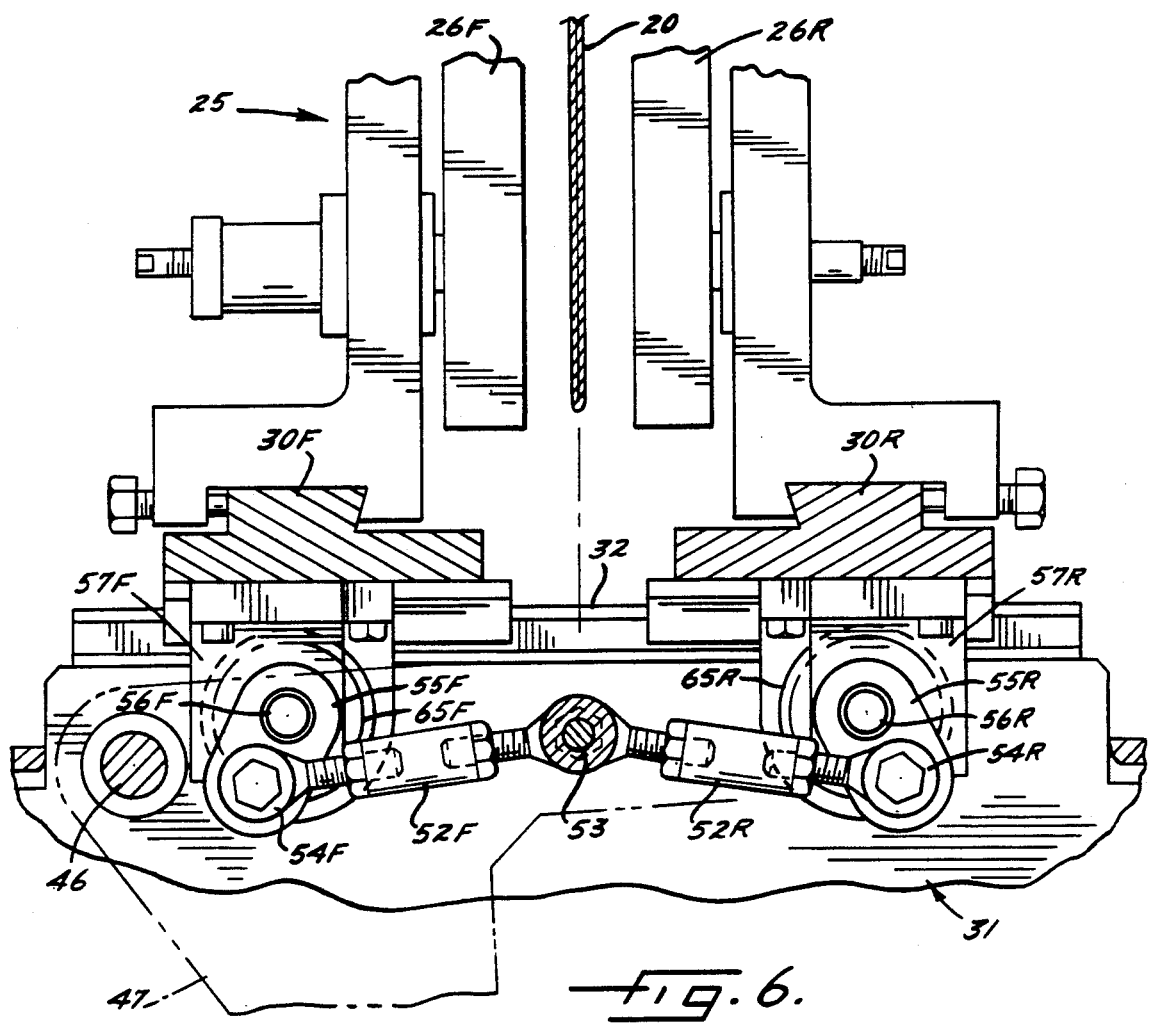
FIG. 6 is an enlarged fragmentary cross-section taken substantially along the line 6—6 of FIG. 4 and shows the seal bars fully retracted from the strip and located in a parked position.

In accordance with the present invention, the seal bars 26F and 26R not only are reciprocated linearly toward and away from the strip 20 during normal operation of the machine 10 but also are adapted to be retracted linearly away from the strip to a parked position (FIG. 6) in which the bars are spaced a substantial distance from the strip. The bars 26F and 26R are retracted to their parked position when the machine 10 shuts down and the strip 20 stops and, as a result of the bars being spaced a substantial distance from the strip, the heat radiated from the bars does not soften or melt the strip.

More specifically, normal reciprocation of the bars 26F and 26R is effected in response to clockwise rotation of a shaft 35 (FIG. 3) which is journaled by bearings 36 and located on the base 31 beneath the carriages 30F and 30R. The shaft 35 is adapted to be rotated by means of a motor 37 (FIG. 1) which acts through a speed reducer 38 and a chain drive 39 to rotate a cycle shaft 40. A second chain drive 41 between the cycle shaft 40 and the shaft 35 acts to drive the latter shaft. The cycle shaft also drives the feed rolls 14 by way of a transmission (not shown) and thus rotation of the shaft 35 is effected in timed relation with the rotation of the feed rolls and the intermittent advance of the strip 20.

Two cams 44 (FIGS. 2 and 3) are located adjacent the bearings 36 and are fixed to rotate with the shaft 35. Associated with each cam is a bellcrank lever 45 which is pivoted on a shaft 46 on the base 31 to rock about a horizontal axis extending longitudinally of the strip 20. Each lever 45 includes a generally vertical arm 47 (FIG. 2) having a follower 48 which engages the cam 44 and further includes a generally horizontal arm 49 which extends across the shaft 35 just below the carriages 30F and 30R. A spring mechanism 50 is connected between the base 31 and each horizontal arm 49 and urges the lever 45 counterclockwise about the pivot shaft 46. Thus, each lever 45 is positively rocked in a clockwise direction when the follower 48 encounters a rise on the cam 44 and then is spring-returned in a counterclockwise direction as the follower rides across a fall.

Figure 4:
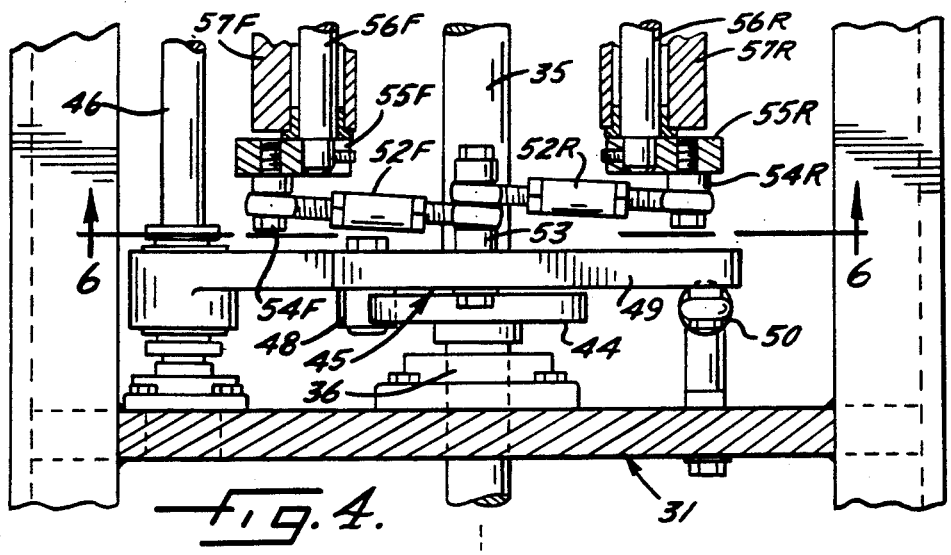

Clockwise rocking of the levers 45 is used to force the bars 26F and 26R inwardly into sealing engagement with the strip 20 during normal operation of the machine 10 while counterclockwise rocking of the levers shifts bars outwardly to the normally retracted position of FIG. 5. For this purpose, the inner ends of two links 52F and 52R (FIGS. 2 and 4) are pivotally connected to a pin 53 which is rigidly coupled to and projects from the horizontal arm 46 of each lever 45. The outer ends of each pair of links are pivotally coupled to connectors 54F and 54R which, in turn, are fastened rigidly to the free end portions of crank arms 55F and 55R. As shown most clearly in FIG. 4, the inboard end portions of the crank arms 55F and 55R are fixed rigidly to shafts 56F and 56R, respectively, which are journaled by bearings 57F and 57R on the underside of the carriages 30F and 30R.

During normal operation of the machine 10, the shafts 56F and 56R are rotationally stationary and keep the crank arms 55F and 55R in fixed angular positions as shown in FIGS. 2 and 5. As the levers 45 rock clockwise from the position shown in FIG. 5, the pivot pins 53 move downwardly toward the position shown in FIG. 2 and act through the links 52F, 52R, the crank arms 55F, 55R and the rotationally fixed shafts 56F, 56R to force the carriages 30F and 30R to slide inwardly toward one another on the base 31. This moves the seal bars 26F and 26R linearly toward one another and into engagement with the strip 20 to effect formation of a seal 21.

Counterclockwise rocking of the levers 45 during normal operation of the machine 10 causes the pivot pins 53 to move upwardly from the position shown in FIG. 2 to the position shown in FIG. 5 and to push against the links 52F and 52R. As a result, the links act against the crank arms 55F and 55R and through the rotationally fixed shafts 56F and 56R to cause the carriages 30F and 30R to slide outwardly along the base 31 and to pull the seal bars 26F and 26R away from the strip 20. Each seal bar normally is retracted about $\frac{1}{8}''$ away from the strip (see FIG. 5). Because of the short stroke, the seal bars can be quickly returned into engagement with the strip during the next sealing cycle.

In carrying out the invention, means are provided for retracting the sealing bars 26F and 26R linearly through a greater distance and to a parked position (FIG. 6) when the machine 10 shuts down. Herein, these means comprise reversible rotary actuators 65F and 65R (FIGS. 2 and 3) connected between the ends of the shafts 56F and 56R, respectively. While the actuators may take various forms, they preferably are rotary air motors adapted to be operated by high pressure air. The motor 65F is illustrated most clearly in FIG. 3 and, as shown, is located midway of the shaft 56F and is operable when actuated to cause the shaft to rotate in the bearings 57F.

The motors 65F and 65R normally hold the shafts 56F and 56R in rotationally stationary positions so as to keep the crank arms 55F and 55R positioned as shown in FIGS. 2 and 5 and permit normal reciprocation of the seal bars 26F and 26R. If the machine 10 shuts down, the motors are automatically actuated in a direction to cause the crank arms 56F to swing clockwise and to cause the crank arms 56R to swing counterclockwise. During such swinging, the crank arms 55F and 55R push the links 52F and 52R, respectively, against the pins 53 on the levers 45. Since the levers are stopped, the pins serve as fixed reaction points and thus pushing of the links against the pins acts through the crank arms 55F and 55R, the shafts 56F and 56R and the bearings 57F and 57R to cause the carriages 30F and 30R to shift linearly outwardly on the base 31 to the parked position shown in FIG. 6. The seal bars 26F and 26R, move outwardly with the carriages and, in this instance, each seal bar is spaced approximately 1.0″ from the strip 20 when the bar is retracted to its parked position. Thus, the heat from the seal bars dissipates before reaching the stopped strip.

Just before the machine 10 is re-started, the motors 65F and 65R are actuated in the opposite direction. This causes the links 52F and 52R to pull against the pins 53 and force the carriages 30F and 30R inwardly from the parked position so that normal operation of the seal bars 26F and 26R may resume. Suitable stops are provided for engaging the crank arms 55F and 55R and limiting the stroke of the carriages to and from the parked position.

From the foregoing, it will be apparent that the present invention brings to the art a new and improved sealing mechanism 25 with seal bars 26F and 26R which move linearly during normal operation and also during an abnormal condition when the bars are retracted to a parked position. Thus, the sealing mechanism attains all of the advantages of linearly movable seal bars and still avoids damage to the strip 20 during shut down.

I claim:

1. Mechanism for forming spaced seals in an elongated heat-sealable strip adapted to be advanced intermittently along a predetermined path, said mechanism comprising a support, a pair of heated sealing bars located on opposite sides of said strip, means mounting said sealing bars on said support for linear movement toward and away from said strip, means for normally moving said bars linearly toward and into engagement with said strip when the strip dwells and for retracting said bars linearly away and out of engagement with the strip before the next advance of the strip, said moving means normally retracting said bars a short predetermined distance away from the strip, and means for retracting said bars linearly away from said strip through a greater distance to a parked position and for keeping said bars in said parked position in response to an abnormal condition interrupting the advance of the strip.

2. Mechanism as defined in claim 1 in which said moving means comprise a rotary shaft on said support, a cam rotatable with said shaft, and a linkage mechanism connected between said cam and said sealing bars and operable to move said bars toward and away from said strip in response to rotation of said cam.

3. Mechanism as defined in claim 2 in which said retracting means comprises reversible actuator means connected between said seal bars and said linkage mechanism, said actuator means being operable when actuated in one direction to act through part of said linkage mechanism and retract said sealing bars to said parked position.

4. Mechanism for forming spaced seals in an elongated heat-sealable strip adapted to be advanced intermittently in an upright plane and along a predetermined path, said mechanism comprising a support, first and second sealing bars located on opposite sides of said strip, first and second carriages mounting said first and second sealing bars, respectively, on said support for linear movement inwardly into engagement with said strip and outwardly away from said strip, a power-rotated cam on said support, a lever pivotally mounted on said support and adapted to be rocked upwardly and downwardly in response to rotation of said cam, first and second generally oppositely extending links each having inner and outer ends, means connecting the inner ends of said links to said lever and support said links to pivot about a common axis which rocks upwardly and downwardly with said lever, first and second crank arms pivotally connected to the outer ends of said first and second links, respectively, first and second shafts rotatably supported by said first and second carriages, respectively, and connected rigidly to said first and second crank arms, said shafts normally being rotationally stationary whereby upward and downward rocking of said lever by said cam normally causes said links to act against said crank arms and through said shafts to force said carriages and said sealing bars inwardly toward and outwardly away from said strip, said sealing bars normally moving a short predetermined distance away from said strip, and first and second actuators connected to said first and second shafts, respectively, and selectively operable to rotate said shafts and said crank arms to cause said carriages and said sealing bars to move outwardly away from said strip through a distance greater than said predetermined distance and to a parked position.

* * * * *